United States Patent [19]

Bartz

[11] 4,378,055
[45] Mar. 29, 1983

[54] ANALYZING FOR HELIUM IN DRILLING MUDS TO LOCATE GEOTHERMAL RESERVOIRS

[75] Inventor: Gerald L. Bartz, Bartlesville, Okla.

[73] Assignee: Phillips Petroleum Company, Bartlesville, Okla.

[21] Appl. No.: 822,178

[22] Filed: Aug. 5, 1977

[51] Int. Cl.³ ............................................. E21B 49/00
[52] U.S. Cl. ...................................... 175/50; 73/153; 166/253; 436/25; 436/30
[58] Field of Search ....................... 175/50, 58, 59, 60, 175/38; 166/253, 254; 73/153, 19, 23; 23/230 EP; 165/45

[56] References Cited

U.S. PATENT DOCUMENTS

| | | | |
|---|---|---|---|
| 2,923,151 | 2/1960 | Engle et al. | 73/153 |
| 3,097,924 | 7/1963 | Kinney et al. | 23/209 |
| 3,835,710 | 9/1974 | Pogorski | 23/230 EP |
| 3,893,299 | 7/1975 | Hutchinson | 165/45 X |

*Primary Examiner*—William F. Pate, III

[57] ABSTRACT

A method of subterranean exploration which comprises locating areas of anomalously high concentrations of helium indicative of geothermal reservoirs, geopressurized zones, petroleum reservoirs and radioactive ore deposits. Also disclosed is a method of producing helium which comprises collecting gases from a geothermal source and separating helium from such gases.

3 Claims, No Drawings

ANALYZING FOR HELIUM IN DRILLING MUDS TO LOCATE GEOTHERMAL RESERVOIRS

This invention relates to methods for geochemical subterranean exploration and helium production.

In the drilling of geothermal wells, conventional gas analyses, such as for carbon dioxide, hydrogen sulfide or hydrocarbon gases, are often unreliable because these gases are either not present or they react with the containing rock wall or the geothermal fluids. Consequently, these gases may be spent on their way from the reservoir to the borehole, or they may be of such low level that their contribution to the background level of gases may not be detected.

Conventional geophysical logging techniques are often of little value in detecting faults and fractures in geothermal areas. Conventional geophysical logging techniques cannot detect whether or not the fault or fracture is in communication with a geothermal reservoir or is merely a permeable strata between the borehole and the reservoir.

I have found that the deficiencies of the above conventional analyses and techniques are overcome by analyzing the drilling fluid for helium. Alternately, cores taken from the subsurface formations penetrated by the well bore at various intervals during the drilling can be analyzed for helium concentrations. Anomalous concentrations of helium do not emanate from non-permeable faults or fractures, and because helium is inert, it does not react with either wall rock or subsurface fluids.

Additionally, I have found that helium detection is useful in determining the proximity of a well bore to a geopressurized zone, determining the proximity of a well bore to a petroleum reservoir, determining the proximity of a well bore to a radioactive ore deposit and for determining the mud weight necessary to drill through low intensity geopressurized zones. I have also found that geothermal water is a potential source of helium which can be economically produced.

It is an object of the present invention to provide a method for determining the proximity of a well bore to a geothermal source.

Another object of the present invention is to provide a method for determining the proximity of a well bore to a geopressurized zone.

Still another object of the present invention is to provide a method for determining the proximity of a well bore to a radioactive ore deposit.

Yet another of the present invention is to provide a method for exploring an area of the earth's surface for detection of a geothermal reservoir.

A further object of the present invention is to provide a method for determining the mud weight necessary to drill through a low intensity geopressurized zone.

A yet further object of the present invention is to provide a method for determining the proximity of a well bore to a petroleum reservoir.

An additional object of the present invention is to provide a method for economically producing helium from a geothermal reservoir.

Other objects, aspects and advantages of the present invention will be apparent to those skilled in the art from a reading of the following detailed description and appended claims.

In accordance with the present invention there is provided a method for subterranean exploration comprising analyzing samples of drilling fluid for anomalously high concentrations of helium.

In the drilling of wells by the rotary well drilling process, it is customary to employ a well drilling fluid or drilling mud comprising a liquid such as water, or oil, or emulsions of either one of the liquids dispersed in the other. Air can also be used as a drilling fluid. This well drilling fluid is pumped down through the drill stem to emerge into the well through openings in the drill bit and returned to the surface through the annular space between the drill stem and the well bore, cooling the bit and carrying cuttings to the surface. Alternatively, this circulation can be reversed by forcing the fluid down the annular space and back up through the drill stem. In order to prevent gas and oil under high pressure in earth formations penetrated by the well bore from blowing the drilling fluid out of the hole, sufficient hydrostatic head is applied to the drilling fluid adjacent the formation to overbalance the formation pressure. This head can be increased by adding weighting materials to the drilling fluid, for example, finely ground barium sulfate, or iron oxides, or lead oxides. Various clays and chemicals are added if desired to maintain the solids dispersed in the fluid, and natural additions of sand or clay to the fluid occur in drilling through different formations. The terms "drilling fluid" and "drilling mud" are used interchangeably herein in the subsequent descriptions of the various embodiments of the present invention.

In one embodiment of the present invention, the proximity of a well bore to a geothermal source is determined by analyzing the drilling fluid, either intermittently or continuously, for helium, wherein an increase in the concentration of helium over a predetermined background level of helium is indicative of the proximity of the well bore to the geothermal source.

Unlike other gases, helium is more soluble in hot water than in cold water. Therefore, as reservoir water is heated, it scavenges helium which migrates upwardly along gas permeable zones of weakness created by a cooling magmatic body. As a drill bit penetrates through conjugate fractures adjacent to a potential reservoir zone, the helium charged fluids in these fractures mix with the drilling mud and are transported to the surface where they are detected.

To employ the method of the present invention, the helium content of the drilling mud is determined and monitored, either intermittently or continuously, during drilling operations. The background level of helium is established during the early stages of drilling the well. This background level may not be constant, but can vary gradually during the drilling operation. During monitoring operations, the average helium content of the drilling fluids from the upper strata are assumed to be the normal helium background level. Moderate increases in the helium content over the background level indicate faulted strata. Further increases in helium content indicate that the drill bit is approaching a geothermal reservoir. For example, the background level may range from about 5 to about 12 ppm by volume, while faulted strata will have greater than about 12 ppm helium. Helium levels above 20 ppm, generally in the range of 70–1700 ppm, are found in fluids near geothermal reservoirs.

In another embodiment of the present invention, the proximity of a well bore to a geopressurized zone is determined by analyzing the drilling mud, intermittently or continuously, for helium, wherein an increase in the concentration of helium over the background level is indicative of the proximity of the well bore to a geopressurized zone.

Geopressurized zones are sands or shales containing pressurized warm water. The warm water acts as a helium sink and maintains its high helium level as long as the pressure remains constant. A slight pressure decrease associated with drilling activity causes the helium to leave the geopressurized zone and enter the overlying strata. As the well bore proceeds through such strata the helium is taken up in the drilling mud. By monitoring the helium content of the drilling mud, the proximity of the well bore to an impending geopressurized zone can be predicted, thus preventing an unsuspected, potentially dangerous and costly blowout.

To employ the method of predicting an impending geopressurized zone, the helium content of the drilling mud is determined and monitored during drilling operations. During monitoring operations, the average helium content of the drilling fluids from the upper strata is assumed to be the predetermined normal helium background level. For example, the background level may have a range of 5–12 ppm by volume, while buildups in excess of 12 ppm would indicate that the drill is approaching strata containing degassing hot water and a suspected pressurized zone. Appropriate steps could then be taken to prevent the occurrence of a blowout.

In yet another embodiment of the present invention, exploration of an area of the earth's surface for detection of a geothermal reservoir is carried out by determining soil gas helium content at a plurality of locations and correlating the helium anomalies so found with the sampling locations.

To employ the method of exploring for geothermal reservoirs, samples are taken in a pre-arranged pattern in the area of a suspected geothermal reservoir. A station spacing of 100–1500 feet can be used. The samples are collected at a depth of 18–24 inches using a soil gas probe. The samples are sealed until analysis can be carried out.

The helium content of each sample is compared to that of air (about 5 ppm by volume). Air is used to establish the analytical precision of the instrument employed. The predetermined regional background level of helium in soil gas is then determined. The helium content of each sample from the suspected area is determined and compared with that of air and the results are plotted according to the grid spacings employed.

In another aspect of the present invention, helium is reclaimed from a geothermal water source. The hot water and steam from such a geothermal source is a natural helium trap. Helium can be extracted from geothermal hot water and/or steam directly from the hot water and steam at or near the subterranean source, as a byproduct of geothermal hot water and steam used for the generation of electricity and as a byproduct of hot water and/or steam used for purposes other than the generation of electricity.

The process is based on the previously mentioned fact that above 30° C. helium is more soluble in hot water than it is in cold water. Hot water scavenges helium in the lithosphere. As hot water cools, such as by flashing or by expending its heat doing work, helium degasses and can be collected in the gas phase.

Suitable helium collection points from a geothermal water source can be positioned above subsurface geothermal hot water sources, positioned at gas relief valves in the conduits connected to the geothermal sources, and positioned above or downstream from turbines or other forms of expansion motors driven by the steam from the geothermal source.

Helium is currently produced in three ways. One production technique involves the pulverization of certain helium-containing minerals and the subsequent pumping away of the helium released thereby. Additional quantities of helium can be separated from finely ground minerals by heating the powdered substance, or by dissolving it in hot sulfuric acid, or by fusing it with potassium sulfate.

Another currently employed method of producing helium involves the use of industrial air rectification columns wherein a residual gaseous mixture of neon and helium collects above liquid nitrogen. Helium is separated from neon by means of liquid hydrogen which causes the neon to solidify, or by absorbing the neon by activated charcoal cooled by liquid nitrogen.

The third method currently employed in producing helium is the condensation of natural gas. This technique is based on the fact that helium is the least condensable of all gases.

The method of producing helium in the present invention is estimated to be more economical to practice than any of the three methods discussed above. The present method requires only the separation and collection of gas from the hot water and steam from the geothermal source and then separation of the helium from the other gases so collected, the major constituent of these collected gases being carbon dioxide which is more easily separated from helium than is nitrogen. The helium content of the gases collected from the geothermal source is estimated to be as large as 0.2 percent or 400 times the helium content of air.

In a further embodiment of the present invention, the mud weight necessary to drill through low intensity geopressurized zones can be determined by monitoring the helium content of the drilling mud.

To employ this method, the helium content of drilling mud is determined and monitored during drilling operations. The predetermined background level of helium is established during the early stages of drilling the well. During the drilling operation, should the concentration of helium in the drilling mud increase to a point sufficient to indicate an impending geopressurized zone, the mud weight is increased. The heavier well fluid is then analyzed for helium as it is circulated through the well bore. A decrease in the helium content of the drilling mud indicates that the hydrostatic pressure of the mud is increasing and thus approaching the formation pressure of the pressurized zone. Hydrostatic pressure exceeding that of the geopressurized zone will cause the helium level to return to the normal background level.

In yet a further embodiment of the present invention the proximity of a well bore to a petroleum reservoir or source is determined by analyzing the drilling mud for helium, wherein an increase in the helium concentration over the normal background level is indicative of the proximity of the well bore to the petroleum source. This technique is founded on the fact that helium is very soluble in petroleum. In order to analyze the helium content of the drilling mud, the gas is separated from the mud and passed through a continuous or static sampling system wherein it is analyzed and the helium content is determined.

Various devices for continuously separating hydrocarbon and other gases from drilling mud are known in the art. These devices can also be used for separating helium from a drilling mud. For example, the mud/gas separator shown in U.S. Pat. No. 2,663,379 issued to Doan and U.S. Pat. No. 2,694,923 issued to Engle et al, incorporated herein by reference, can be used for this purpose. The helium sampling can also be carried out intermittently. Analysis of the gas for helium can be made by gas chromatography, as described by Laseter in U.S. Pat. No. 3,447,360, incorporated herein by reference, or by mass spectrometry.

This last-mentioned technique is also advantageous when employed in exploration for radioactive ore deposits such as uranium and thorium by means of exploratory drilling wherein drilling fluid or drilling mud is circulated through the drill string and returned through the annulus in an otherwise conventional manner. Since it is known that uranium and thorium deposits are accompanied by gases enriched in helium, analysis of the helium content of the gases separated from the drilling fluid or mud returns can provide indications of the location of such deposits when helium anomalies are detected by the gas sampling system through appropriate techniques such as gas chromatography or mass spectrometry as described above. As previously noted, the background level of helium is established during the early stages of drilling of the exploratory well. During the drilling operation, increases detected in the helium content over the predetermined background helium level indicate that the well bore is nearing or passing through strata containing uranium or thorium deposits.

The following examples illustrate the invention:

EXAMPLE I

Drilling fluids from a well drilled in the Roosevelt Hot Springs area near Milford, Utah were monitored for helium content for a period of 40 days. This well is located less than one mile approximately east-southeast of the Dr. Davies' steam well.

Previous geothermal drilling operations in the Roosevelt area have included the monitoring of carbon dioxide content of drilling fluids in an effort to anticipate blowout zones and identify geothermal entry zones. The results of such monitoring indicate that the carbon dioxide concentration increases with well depth regardless of whether or not the well produces geothermal fluids. These increases in carbon dioxide concentration can mask a carbon dioxide buildup which may precede a blowout or can mask a leak associated with a geothermal entry zone.

Helium was extracted from the drilling fluids with a commercial mud/gas separator and duplicate samples were collected at 10-ft. intervals between the depths of 300 and 7500 feet. The helium content of the air-gas mixture was determined with a Model 24-120B helium leak detector, manufactured by the Instrument Products Division of E. I. duPont and Company. The instrument consists of a 1-cm radius, 180° deflection mass spectrometer calibrated to collect helium ions of atomic mass 4.

Detection sensitivity of the mass spectrometer to helium was determined by comparing the helium response of air, which contains 5.24 ppm helium by volume, to that of a synthetic air mixture, prepared by Matheson Gas Products, which contained 10.00±0.04 ppm helium. To arrive at a suitable sensitivity for monitoring, the sensitivity was adjusted within the range of 65–292 ppb/Mv by varying the source pressure between 0.2 and 0.5 millitorr and the electron ionizing current between 50 and 90%.

A sensitivity setting of approximately 200 ppm/Mv was selected because it (1) minimized signal attenuation despite the large range of helium values and (2) was sufficient to detect small changes (50 ppb/Mv) in helium content.

The helium content of a sample was determined by (1) introducing the gas sample into a constant-pressure inlet system, (2) adjusting the source pressure to equal that used in the sensitivity determination, and (3) recording the signal response on a strip chart recorder. The difference between the helium content of the sample and that of air was obtained by multiplying the response difference, in millivolts, by the sensitivity. This product is referred to as a helium anomaly, which is that concentration of helium exceeding the concentration of helium in air (5.24 ppm by volume).

For purposes of discussion, helium anomalies are grouped according to the depth intervals containing specific fracture characteristics and having geothermal significance:

1. 300 to 600 ft. Within this interval, the range of helium anomalies were 0.09 to 11.6 ppm. Low level, but distinctive helium anomalies occurred at 340 and 590 ft., and within the zone 360–380 ft.
2. 600 to 2000 ft. Electric logs indicated that this interval has the highest density of fractures. Within this interval the range of helium anomalies was 5.4 to 76 ppm. High helium anomalies were associated with the following log-inferred zones: 610–716, 1000–1120, 1230–1850 and 1983–1986 ft. In the first two zones the helium anomaly was limited to the upper part of the zone. For example, in the interval 610–715 ft., the helium anomaly of the upper 70 ft. (i.e. 610–680 ft.) was 10.7 ppm, whereas the mean helium anomaly for the remainder of the interval was 1.6 ppm. A similar trend was observed in the log-inferred zone 1000–1120 ft.
3. 2000–4900 ft. In this interval the range of helium anomalies was 0.2 to 222 ppm. A good correlation exists between fractures inferred from helium anomalies and log data. The log-inferred fractures at the approximate depths of 2110, 2450 and 4600 ft. were correlative with helium anomalies of 4 to 6 ppm.

Three zones with significant helium anomalies were detected which did not have the log characteristics of a significant fracture zone. The depth intervals and the mean helium anomalies of these zones are: 2730–2880 ft., 52 ppm; 3030–3170 ft, 41 ppm; and 3350–3450 ft, 78 ppm. After each interval the helium background values returned to approximately 2 ppm. Data suggest that helium logging can provide supplemental data to that provided by electric logs regarding the geothermal potential of the zone. In the case of a fracture zone having a helium value of less than 10 ppm, for example, the fracture is probably not associated with geothermal fluid. Conversely, fractures having helium values greater than 10 ppm suggest communication with a geothermal reservoir. In the case of the three helium anomalies noted above and having no corresponding log characteristics of fractures, it is proposed that they represent the feather edges of permeable fracture zones in contact with a geothermal reservoir or reservoirs; these edges being so small that they will not conduct significant heat to the well bore and therefore will not be detected by temperature logging of the borehole. This is supported by the fact that large carbon dioxide anomalies were found to be correlative with these three helium anomalies.

4. 4900 to 5610 ft. At a depth of 4900 ft, the helium anomaly abruptly increased from 0.2 to 16.7 ppm and a distinctive pattern emerged. Unlike uphole anomaly patterns, which consisted of a high anomaly bordered by background anomalies of 2 ppm, the concentration of the helium values in this interval never dropped below 4 ppm and averaged 18 ppm. Because log analysis does not support increased fracture density within this zone these high anomalies are best explained by a prolonged feed of helium into the hole from a helium source such as a geothermal reservoir. The presence of a geothermal reservoir entry zone in the vicinity of 4900 ft. was later confirmed by a temperature profile of the well.

5. 5610 to 7500 ft. The correlation between fractures inferred from log data and helium anomalies of greater than 10 ppm is poorer within this interval. Two zones, 6560–6750 and 6210–6400 ft, contained mean helium anomalies of approximately 20 ppm but there are no log characteristics to suggest the presence of a fracture zone. Two zones, 5840–6040 and 7120–7160 ft, having mean helium anomalies of 29.7 and 11.1 ppm, respectively, are correlative with log-inferred fracture zones. Four log-inferred fracture zones, 6820–6870, 6930–6940, 7340–7360 and 7410–7460 ft. were enriched in carbon dioxide but neither contained helium anomalies of more than 10 ppm.

The four zones having helium anomalies greater than 10 ppm are interpreted to represent low permeability feather edges of a geothermal reservoir. The fracture zones containing large concentrations of carbon dioxide, but less than 10 ppm of anomalous helium, may represent the former edges of a geothermal reservoir. This is especially true for the zone 6820–6870 ft. which issued a sharp carbon dioxide burp which displaced 20 gallons of drilling fluid.

EXAMPLE II

In a soil gas survey conducted in the Roosevelt area, 223 stations were sampled along 17 traverses which either crossed or ran parallel to inferred structural lineaments. A station spacing of 0.2 miles was employed. Samples were collected at a depth of 18 inches with a soil gas probe. These samples were immediately stored and sealed in 3 cc metal containers for later analysis in a field laboratory. The helium content of each sample was compared to that of air (5.24 ppm) using the instrument described in Example I. Analytical precision, as determined from 165 duplicate samples, was found to be 12 ppb at the 5.24 ppm level. The regional background level of helium in soil gas within the Roosevelt area appeared to be 30 ppb.

It was found that helium anomalies in the area of geothermal reservoirs are highly localized. For examples, soil gases within 0.2 miles of inferred fractures contained over 60 ppb helium above the background level, while sites having 14,000 and 600 ppb of helium above the background level were located within 0.1 mile of each other. Because of this restricted dispersion pattern, a helium survey can accurately define the surface trace of an open fracture system.

Reasonable variations and modifications, which will be apparent to those skilled in the art, can be made in this invention without departing from the spirit and scope thereof.

What is claimed is:

1. A method of exploring an area of the earth's surface for detection of the bounds of a known geothermal reservoir which comprises determining soil gas helium content at each of a plurality of sampling locations, comparing the soil gas helium content at each of said sampling locations with a predetermined background helium level to determine any helium anomalies and correlating any resulting helium anomalies with the corresponding sampling locations wherein a helium anomaly at a corresponding sampling location is indicative of the proximity of said sampling location to said known geothermal reservoir.

2. The method of claim 1 characterized further to include plotting said sampling locations having helium anomalies associated therewith relative to the earth's surface to indicate the surface trace of said known geothermal reservoir.

3. A method of determining in a drilling operation the drilling mud weight necessary to drill through a geopressurized subterranean zone which comprises monitoring the helium content of said drilling mud, sensing any increase in helium content of said drilling mud in comparison to a predetermined background helium level, increasing the mud weight responsive to said increases in the helium content and thereafter analyzing the helium content of the resulting heavier drilling mud, wherein a decrease in said helium content of said heavier drilling mud is indicative of an increase in hydrostatic mud pressure.

* * * * *